United States Patent [19]

Lopes

[11] Patent Number: 4,758,143
[45] Date of Patent: Jul. 19, 1988

[54] MANUFACTURE OF SPECIALTY ICE CREAM PRODUCTS

[75] Inventor: Jose A. Lopes, South Portland, Me.
[73] Assignee: Deering Ice Cream Corp., Portland, Me.
[21] Appl. No.: 914,446
[22] Filed: Oct. 2, 1986
[51] Int. Cl.$^4$ ............................................. A01J 21/00
[52] U.S. Cl. ...................................... 425/91; 425/155; 118/25; 222/526; 99/450.1; 426/303
[58] Field of Search ................... 425/90, 91, 106, 155, 425/162, 145, 150, 121 Y, 129 R; 118/25; 222/526; 141/181, 182, 188, 189, 103, 227, 228, 266, 387; 99/450.1

[56] References Cited

U.S. PATENT DOCUMENTS

3,181,575 5/1965 Krizka ................................. 141/181
4,000,765 1/1977 Lydiksen ............................ 141/266

Primary Examiner—Bernard Nozick
Attorney, Agent, or Firm—Daniel H. Kane, Jr.

[57] ABSTRACT

In a machine for manufacturing multi-layered decorative ice cream cake and pie products. The machine frame supports a plurality of ingredient dispensing stations including ice cream dispensing stations. A conveyor simultaneously conveys products between the respective stations for indexing and positioning the products. The ice cream dispensers are mounted on lift positioning devices for lowering and raising the ice cream dispensers between a raised standby position and a lowering dispensing position. Ice cream dispensing valves on the ice cream dispensers open and close between a valve open position for flow of ice cream through an ice cream dispensing head from a continuous pressurized source of ice cream and a valve closed position for blocking the dispensing flow of ice cream. An index timer actuates the conveyor to convey products between stations and index products at each station for a selected dwell period. Position timers associated with the lift positioning devices actuate the lift to establish dispensing position intervals. Valve timers associated with the respective ice cream dispenser valves establish valve open intervals. The index timer dwell period, dispensing position intervals, and valve open intervals are operatively related and individually controlled through control elements. A central ice cream command and control panel permits an operator to achieve individualized control over operating parameters.

20 Claims, 8 Drawing Sheets

MANUFACTURE OF SPECIALTY ICE CREAM PRODUCTS

TECHNICAL FIELD

This invention relates to machinery and methods for manufacturing ice cream products and in particular for manufacturing multi-layered decorative ice cream cakes and pies. The invention also provides a new ice cream dispenser and ice cream dispensing head or nozzle for use in manufacturing specialty ice cream products.

BACKGROUND ART

Conventional machines for manufacturing specialty ice cream cakes and pies generally comprise an elongate frame or framework supporting a plurality of ingredient dispensing stations arranged in a sequence or row along the frame. A conveyor delivers products between the respective stations for dispensing selected ingredients and forming and decorating the specialty ice cream products. The ingredient dispensing stations include ice cream dispensers for dispensing and forming ice cream layers and ice cream decorations.

Such ice cream specialty manufacturing machines are exemplified by the Model OK-120 Ice Cream Cake Machine manufactured by OTEM, address 20151 Via Gallarate 228, Milano, Italy, and available from NOR-MECA Ice Cream Division of OTEM, Via Pian Scairolo, P.O. Box 18, CH.6911 Pambio, Noranco (Lugano) Svizzera (Switzerland). Noranco In the conventional ice cream cake and pie manufacturing machines, the ingredient dispensers and in particular the ice cream dispensers at respective dispensing stations of the machine frame are fixed volume displacement dispensers. Variation in the volumetric delivery at any particular station is accomplished by mechanical adjustments at the particular station. Any variations permitted in the height, movement, or other effects of the dispenser are similarly accomplished by mechanical alterations at the particular station. There is no provision for operator interaction with the operational parameters of the respective dispensing stations except by such time consuming mechanical arrangements.

A disadvantage of the conventional ice cream cake and pie manufacturing machines is that substantial down time is required between manufacturing runs for different types of decorative ice cream cakes and pies. There is no opportunity for rapid adjustment of operational parameters at the respective dispensing stations for changeover between product runs or design of new products. Nor is there any centralized operator control of the decorative product design parameters at the dispensing stations. Even with the mechanical alterations available at the individual stations, the range of parameter variations for achieving different specialty and decorative effects in delivering ingredients is limited.

OBJECTS OF THE INVENTION

It is therefore an object of the present invention to provide a new system for manufacture of specialty ice cream products such as decorative ice cream cakes and pies that enables operator interaction with operational parameters at ingredient dispensing stations from a central control head or control panel. The invention also seeks to increase the operational parameters subject to variation and control for achieving a wider range of specialty decorative effects.

Another object of the invention is to provide machinery and methods for manufacture of decorative ice cream cakes and pies which permits rapid changeover of the operational parameters of the dispensing stations between product runs for different specialty ice cream products and also permits operator interaction with the machinery for product development and product design.

A further object of the invention is to provide a new ice cream dispenser and ice cream dispensing station capable of dispensing and delivering a continuous flow of ice cream under electronic or pneumatic controls for rapid and wide-ranging control over volumetric and configurational effects in the ice cream delivery and in forming specialty ice crea products. The invention also seeks to provide electronic and pneumatic controls over a variety of dispensing parameters including height positioning, motion, timing, etc., for further wide-ranging control and operator interaction with decorative effects achieved during dispensing and delivery of the ingredients.

Yet another object of the invention is to provide a new ice cream dispensing head or nozzle capable of delivering ice cream under wide-ranging operational parameters and over a range of ingredient mixtures including ice cream mixed with solid ingredients without clogging or blocking. The invention also seeks to achieve an ice cream dispensing head or nozzle configuration for contact shaping delivered ice cream without sticking of ice cream at the contact surfaces.

Overall the invention seeks to achieve a system for design and manufacture of specialty decorative ice cream products with rapid centralized command and control over operational parameters at the respective ingredient dispensing stations of the system framework.

DISCLOSURE OF THE INVENTION

In order to accomplish these results the invention provides a new machine and machine frame which supports a plurality of ingredient dispensing stations including ice cream dispensing stations having an ice cream dispensing head constructed and arranged for dispensing ice cream on a product indexed or positioned at the station. A conveyor simultaneously conveys products between the respective stations for indexing and positioning the products at the dispensing stations.

According to the invention a plurality of lift positioning devices or lifts are provided, each operatively coupled to a respective ice cream dispenser for lowering and raising the ice cream dispenser at the respective station between a raised standby position and a lowered dispensing position. The invention also provides a plurality of valves, such as, for example, pneumatically actuated valves each operatively coupled to a respective ice cream dispenser. The valve is designed for opening and closing between a valve open position for flow of ice cream through the ice cream dispensing head from a continuous pressurized source of ice cream coupled to the ice cream dispensing head and a valve closed position for blocking the dispensing flow of ice cream.

An index timer generates timed index pilot signals for actuating the conveyor to convey products between stations and to maintain the products at each station for a selected dwell period. The index timer is adjustable for varying the frequency of the index pilot signals and the dwell period at the stations. The index timer frequency is selected according to the design of the products on the conveyor indexed or positioned at the respective ingredient dispensing stations.

A plurality of position timers each associated with a respective lift positioning device generate dispensing position interval signals. Each position timer is coupled to a respective lift positioning device or lift for actuating the lift to lower the ice cream dispenser to the dispensing position and maintain the ice cream dispenser in the lowered dispensing position during a dispensing position interval less than the dwell period. The position timers and the dispensing position interval signals are adjustable to vary the dispensing position interval for achieving different ice cream configurations according to the decorative design of the products on the conveyor indexed or positioned at the ice cream dispensing stations.

The system also includes a plurality of valve timers associated with the respective valves for generating valve open interval signals. Each valve timer is operatively coupled to a respective valve for actuating and opening the respective ice cream dispenser valve and for maintaining the valve in open position for dispensing ice cream during a selected valve open interval less than the dwell period. The valve timers and valve open interval signals are adjustable to vary the valve open interval for dispensing different quantities of ice cream and for achieving different ice cream configurations according to the decorative design of the products on the conveyor indexed or positioned at the ice cream dispensing stations.

According to the invention the conveyor is operatively arranged and coupled for actuating the position timers when products are indexed or positioned at the respective stations to initiate the dispensing position interval signals and position the ice cream dispensers. Similarly, the lift positioning devices or lifts are operatively arranged and coupled for individually actuating the respective valve timers to initiate the respective valve open interval signals when a respective ice cream dispenser is in the lowered dispensing position.

A feature and advantage of the system of the present invention is that a central ice cream command and control panel can be implemented having control elements operatively coupled to the index timer, position timers, and valve timers for individualized operator interaction and control of the respective index pilot signals, dispensing position interval signals, and valve open interval signals. As a result, the operator can achieve individualized control over the quantity and configuration of ice cream dispensed at the respective ice cream dispensing station with separate and individual control over the operational parameters at each of the different dispensing stations.

According to the new method for manufacturing decorative ice cream cake and pie products at the ingredient dispensing stations including ice cream dispensing stations, the invention contemplates the steps of conveying the products to successive ingredient dispensing stations, maintaining the products at the respective dispensing stations for selected dwell times, lowering ice cream dispensers at the respective ice cream dispensing stations to lowered dispensing positions, and maintaining the ice cream dispensers at the dispensing positions for dispensing position time intervals less than the dwell time.

The invention further contemplates opening the ice cream dispensing valves provided on the respective ice cream dispensers to a valve open position for flow of ice cream through the ice cream dispensers onto products indexed or positioned at the stations from continuous pressurized sources of ice cream coupled to the ice cream dispensers, and maintaining the valve in valve open position for a selected valve open interval for dispensing a selected configuration and quantity of ice cream. The invention provides for shaping and forming the ice cream as it is dispensed from the ice cream dispensing head, closing the valve for blocking the dispensing flow of ice cream through the ice cream dispenser, lifting the ice cream dispenser to a raised standby position, and conveying the ice cream products to the next stations following completion of the dwell time.

A feature and advantage of the new method is that each of the steps may be adjusted and varied to achieve different quantities, configurations and effects by an operator at a central ice cream command and control head or panel through electronic and pneumatic controls. Furthermore, the invention provides the capability for separately varying and controlling the operational parameters individually at each of the different ingredient dispensing stations for different operational parameters and effects at each station.

In the preferred embodiment the ice cream dispensing head is formed with a dispensing channel and outlet for dispensing a continuous flow of ice cream, and an ice cream inlet coupling for coupling a continuous pressurized source of ice cream to the ice cream dispensing head. The ice cream dispensing head is elongate with a dispensing channel through the elongate direction and a dispensing outlet at one end of the head. The dispensing head is formed with an extended ice cream shaping and forming surface area around the dispensing outlet in a plane substantially perpendicular to the flow of ice cream through the dispensing channel and outlet.

A feature and advantage of this arrangement is that the extended ice cream shaping and forming surface area causes contact shaping and forming of the ice cream dispensed from the dispensing outlet. To prevent sticking of ice cream on the ice cream shaping and forming surface area, the dispensing head is formed with a hollow portion at the dispensing outlet end adjacent to the ice cream shaping and forming area. The dispensing head or nozzle is also formed with circulating inlet and outlet couplings for circulating heating liquid through the hollow portion of the dispensing head to prevent the sticking of ice cream on the ice cream shaping and forming surface area.

According to yet another feature of the invention the dispensing channel or passageway through the ice cream dispensing head is of sufficient diameter, for example at least 1 inch (2.5 cm) to 1½ inches (3.7 cm) in diameter, for dispensing solid ingredients mixed with the ice cream selected from the group consisting of nuts, fruits, and condiments without blocking or clogging the dispensing channel through the dispensing head. Typically the forming surface area around the dispensing outlet is a generally flat surface lying in the plane substantially perpendicular to the direction of flow of ice cream for shaping and forming flat layers of ice cream on the ice cream cakes and pies.

In order to implement the control elements for central command and control of ice cream dispensation, quantification, and shaping configuration, the ice cream dispensing valves in the preferred example are provided by three-way electrically piloted pneumatic solenoids, and the valve timers are provided by interval valve timer relays generating electrical valve open interval signals for electrically piloting the valve solenoids. The valve open interval signals open the valve solenoids at the beginning of the valve open interval and close the valve solenoids at the end of the interval. Similarly, the lift positioning devices or lifts are provided by three-way electrically piloted pneumatic lift solenoids and the position timers are provided by interval position timer relays for generating the electrical dispensing position interval signals for electrically piloting the lift solenoids. The dispensing position interval signals lower the respective ice cream dispensers to the dispensing positions at the beginning of the dispensing position interval and raise the ice cream dispensers to the standby position at the end of the dispensing position intervals.

In the preferred embodiment the conveyor includes a pneumatic index solenoid for driving the conveyor between stations. The index solenoid is operatively arranged and coupled for actuation at each index pilot signal of the index timer to drive the conveyor between stations and index or position products at the respective stations. An index microswitch is operatively positioned for actuation at the completion of the stroke of the index solenoid when products are indexed or positioned at the respective dispensing stations. The index microswitch is coupled to the various position timers for initiating the position interval signals when products are indexed in position at the ingredient dispensing stations.

If a pneumatic index microswitch is used, the index microswitch generates position timer actuating air signals. A plurality of lift air-to-electric interfaces are therefore operatively coupled between the pneumatic index microswitch and the respective position timers for converting the air signals to electrical signals to initiate the dispensing position interval timing signals.

Dispensing position microswitches are operatively positioned at the dispensing stations for actuation when the respective ice cream dispensers reach the dispensing positions. If pneumatic microswitches are used, the pneumatic dispensing position microswitches generate valve timer actuating air signals. A plurality of valve air-to-electric interfaces are therefore operatively coupled between the pneumatic dispensing position microswitches and the respective valve timers for converting the air signals to electrical signals to initiate the valve open interval signals.

According to another operational parameter of the invention the lift position devices are each provided with a height adjustment mechanism for adjusting the height of the lowered dispensing position relative to products on the conveyor indexed or positioned at the respective ice cream dispensing stations. A feature and advantage of this arrangement is that it affords yet another operational parameter under operator control for individualized adjustment at each of the different dispensing stations for achieving different ingredient configurations, shapes, and effects.

Yet another advantage of the central ice cream command and control afforded by the present invention is that the operator may control the relative timing of the sequential events separately at each dispensing station including control over the timing of the dispensing position interval relative to the valve open interval. For example, the valve open interval may be set and timed to extend beyond the end of the dispensing position interval for dispensing ice cream while the dispensing head is rising from the lowered dispensing position to the upper standby position, but all prior to expiration of the dwell period.

Other objects, features, and advantages of the invention are apparent in the following specification and accompanying drawings.

BRIEF DESCRIPTION OF THE DRAWINGS

FIG. 4A is a detailed plan view from above of the ice cream dispensing head or nozzle while

FIG. 5 is a detailed diagrammatic side view of the ice cream dispenser lift positioning device or lift at one of the ice cream dispensing stations also showing the dispensing position height adjustment mechanism while

DESCRIPTION OF PREFERRED EXAMPLE EMBODIMENTS AND BEST MODE OF THE INVENTION

Figure 1:
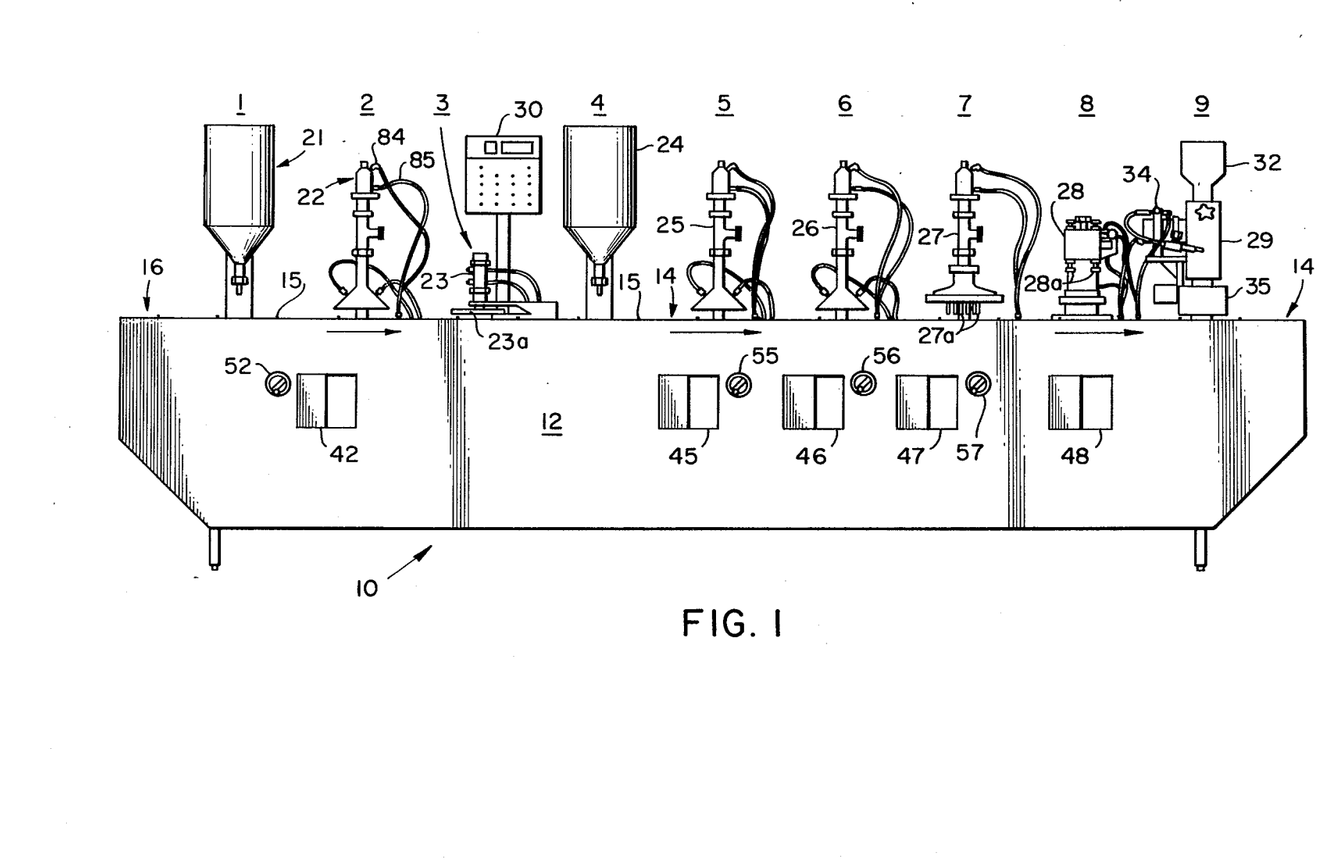
FIG. 1 is a diagrammatic front view of the system apparatus for manufacturing decorative ice cream cakes and pies according to the invention showing the machine frame and conveyor with nine ingredient dispensing and ingredient processing stations distributed along the frame and conveyor.

An ice cream cake and pie machine or manufacturing system 10 according to the invention is illustrated in FIG. 1. In this example, nine sequential ingredient dispensing or processing stations designated by the underscore numerals 1 through 9 are mounted in a row and supported on an elongate frame 12. The top of the main frame 12 provides an elongate track surface 14 supporting a conveyor 15 for conveying or delivering ice cream cake or pie products between the respective dispensing and processing stations 1 through 9 and for indexing and positioning the ice cream cake or pie products at the respective dispensing stations.

The ingredient dispensers and ingredient processing equipment mounted at the respective ingredient dispensing and processing stations 1 through 9 in the example of FIG. 1 are summarized in Table I. A liquid dispenser 21 for dispensing or delivering a liquid dose of syrup is mounted at station 1 followed by an ice cream dispenser 22 mounted at station 2 for dispensing, spreading, and shaping an ice cream layer. A tamper 23 mounted at station 3 tamps various ingredient layers with a plastic disc tamper 23a. Another dose of liquid syrup is dispensed by liquid dispenser 24 mounted at station 4.

Further ice cream dispensers 25, 26 and 27 are mounted in sequence at stations 5, 6 and 7. The ice cream dispensers 25 and 26 dispense, spread and shape ice cream into further layers while ice cream dispenser 27 through tube filler nozzles 27a dispenses and forms decorative ice cream rosettes. Sprayer 28 mounted at station 8 sprays confectionary sauce or chocolate for decorative affects through nozzles 28a while nut dispenser 29 mounted at the last station 9 delivers and places a final layer of chopped nuts. The control head or control panel 30 as hereafter described is positioned at an accessible location for example between stations 2 and 4 or between stations 3 and 4.

TABLE I

| Station | Function |
| --- | --- |
| 1 | Liquid Dispenser (21) |
| 2 | Ice Cream Dispenser (22) |
| 3 | Tamper (23) |
| 4 | Liquid Dispenser (24) |
| 5 | Ice Cream Dispenser (25) |
| 6 | Ice Cream Dispenser (26) |
| 7 | Ice Cream Rosette Dispenser (27) |
| 8 | Sauce Sprayer (28) |
| 9 | Nut Dispenser (29) |
| Between 3 and 4 | Control Panel (30) |

In a typical run for example producing ice cream cakes a round cake or disc of cake material is placed by an operator at the starting end 16 of the conveyor and station sequence on a tray or holder on the conveyor 15. The conveyor conveys or delivers the round cake and subsequent layers to the successive stations indexing and positioning the cake for a dwell period at each station sufficient to complete the ingredient dispensing or other processing function.

A liquid dose of syrup is administered to the round cake by the liquid dispenser 21 at station 1 and a layer of ice cream of selected flavor is then spread and formed on the round cake by ice cream dispenser 22 at station 2 as hereafter described in further detail. An operator then places another round cake or cake disc on the ice-cream layer and tamper 23 tamps or presses the second round cake disc into the ice cream layer by means of the tamper disc 23a. Another dose of liquid syrup is administered by the liquid dispenser 24 at station 4 followed by formation of another ice cream layer at station 5 by ice cream dispenser 25. Yet another ice cream layer is dispensed and formed at station 6 by ice cream dispenser 26 with or without a further intermediate round cake layer.

In the final sequence the ice cream cake is finished with decorative effects. At station 7 the ice cream dispenser 27 is fitted with an array of tube filler nozzles 27a which dispense ice cream rosettes in the desired pattern on the top surface of the cake. Confectionary sauce, for example chocolate sauce, is dispensed in a desired decorative pattern or configuration on the surface of the ice cream cake product at station 8 by sprayer 28 through nozzles 28a. Finally the nut dispenser 29 at station 9 including hopper 32, vibrator 34, and spreader 35, delivers chopped nuts in a desired layer configuration over the final surface. The finished cake product may then be conveyed to another location for appropriate packaging.

The liquid dispensers 21 and 24 and tamper 23 are of the conventional type provided for example in the Model OK-120 Ice Cream Cake Machine manufactured by OTEM and available from NORMECA Ice Cream Division of OTEM referred to above. Similarly the confectionary sauce or chocolate sprayer 28 and nut dispenser 29 are of the conventional type for example manufactured by OTEM and available from the NORMECA Ice Cream Division of OTEM. The sprayer 28 is constructed with four nozzles 28a on each side arranged for example in square configuration not all of which are visible in the view of FIG. 1. Further details of the nut dispenser 29 are also available from the conventional sources.

The ice cream dispensers 22, 25, 26 and 27 are of novel configuration and arrangement and hereafter described and disclosed in further detail. They cooperate with the other elements of the ice cream cake and pie machine and in particular with the control system and control panel 30, also hereafter described and disclosed, to provide a new and greatly improved ice cream cake and pie manufacturing main frame, machine or system 10. With respect to other features visible on the frame 12 of FIG. 1 the openings 42, 45, 46 and 47 provide drains for waste ice cream or run-off ice cream dispensed at stations 2, 5. 6 and 7. Collectors or buckets are normally placed below the drain or run-off openings 42, 45, 46 and 47 during a product run. The run-off opening 48 performs a similar function for station 8 for either sauce or for ice cream if the sprayer 28 is substituted with another ice cream dispenser at station 8. The hand cranks 52, 55, 56 and 57 permit adjustment of the height of the dispensing position of the respective ice cream dispensers 22, 25, 26 and 27 as hereafter described.

It is understood that the arrangement of dispensing stations 1 through 9 and the sequence of ingredient dispensers or other ingredient processing equipment of FIG. 1 represents only a particular example embodiment and the stations and ingredient dispensers may be arranged in other sequences and combinations according to the design, contents and appearance of the ice cream cake or pie product. For any particular ice cream cake or pie product only some of the stations and ingredient dispensers may be used, or greater numbers of stations and different ingredient dispensers or ingredient processing equipment may be used without departing from the scope of the present invention.

The main frame 12 is normally placed on a nonporous cleanable surface with an appropriate drain and the frame 12 is mounted on legs above the floor surface. Ice cream delivery lines at ice cream pressures for example 40 psi provide continuous sources of pressurized ice cream of selected flavors. These lines, not shown, are available at the locus of the ice cream cake and pie machine 10 for coupling to the various ice cream dispensers in this example positioned at stations 2, 5, 6 and 7. The further details of the system organization according to the invention are hereafter described.

Figure 2:
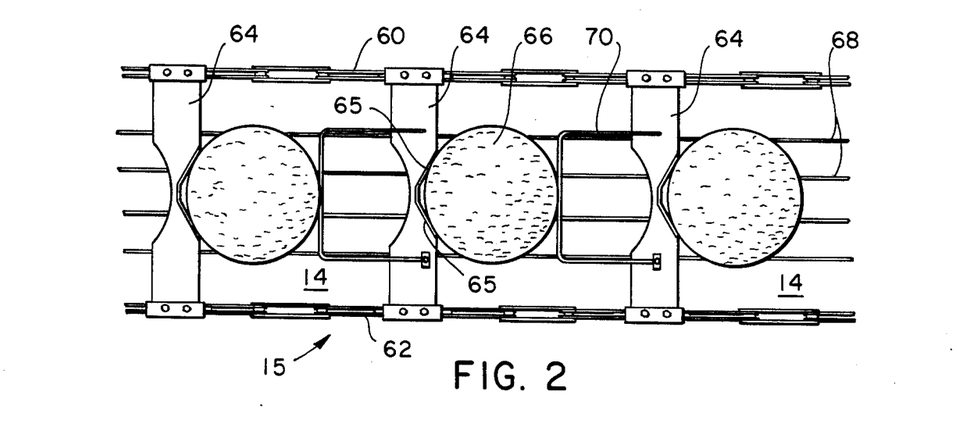
FIG. 2 is a fragmentary detailed plan view of the conveyor showing ice cream cake products to be indexed at stations along the frame by the conveyor.

A detailed plan view of the conveyor 15 supported on the elongate track surface 14 on the top of the frame 12 is illustrated in FIG. 2. The conveyor is provided by two conveyor chains or index chains 60 and 62 joined in spaced apart relationship by bars 64 formed with the indented guides 65 for receiving a round cake layer 66 mounted on a tray or cardboard disc. The round cake 66 along with the ice cream cake or pie product layers subsequently developed is pushed by the conveyor guide or pusher 65 and slides over the stationary bars or rods 68. The rods 68 are mounted in stationary position on the elongate upper surface or track surface 14 of the frame 12. The ice cream cake or pie product is further held in position on the conveyor by the spacer rod 70 mounted on the next cross bar 64.

The conveyor 15 is actually moved along the track surface 14 of frame 12 by a solenoid piston referred to as the index solenoid hereafter described. The conveyor chains or index chains 60 and 62 are formed in endless loops traveling over the top of the frame 12 and at least one of the chains 60 and 62 is formed with notched cams, not shown, at spaced positions along the conveyor chain. The index solenoid piston pushes on the notched cam of the conveyor chain with a stroke of for example 12 to 14 inches (30.5 to 35.5 cm) selected to advance the conveyor the spaced positions between stations and index ice cream and cake products 66 on the conveyor 15 at the respective stations 1 through 9 in alignment beneath the ingredient dispensers or other ingredient processing equipment.

Figure 2A:
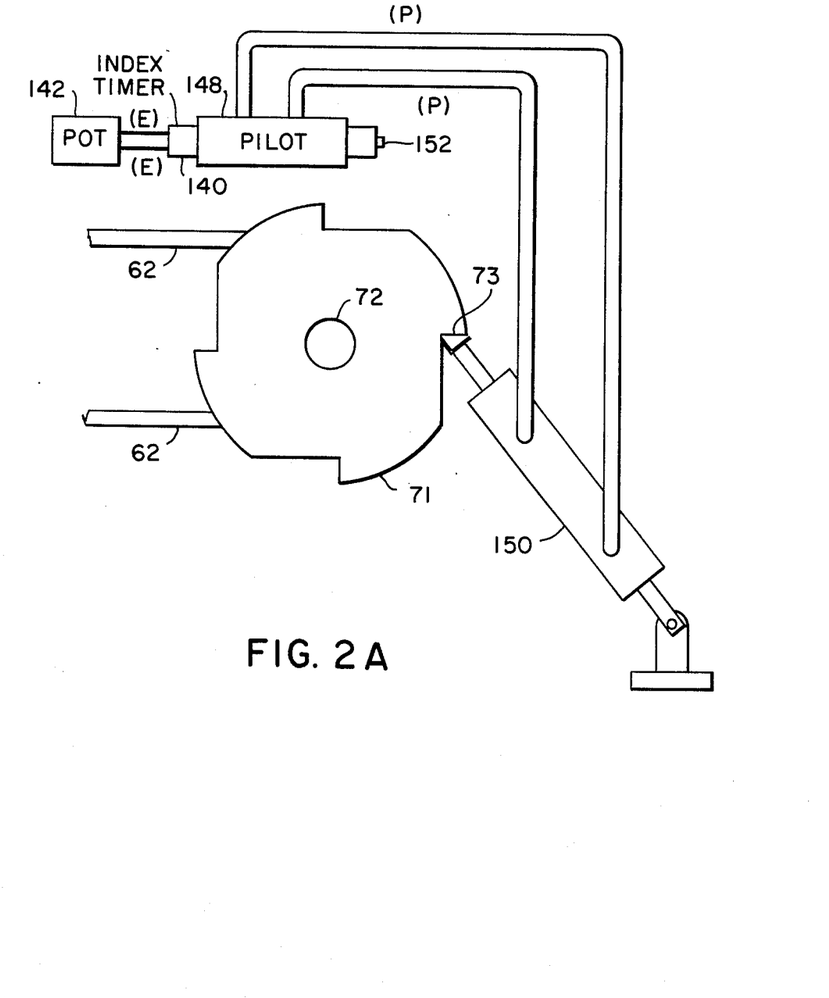
FIG. 2A is a diagrammatic side view of an example cam coupling of the index solenoid and the endless loop conveyor chains for advancing the conveyor through spaced positions or stations for the timed dwell periods.

Advancing and indexing of the conveyor 15 by endless loop conveyor chains or index chains 60 and 62 may be accomplished by known arrangements for cam coupling for example coupling the index solenoid 150 to the endless loop conveyor chains as illustrated in FIG. 2A. Endless loop conveyor chains 60 and 62 turn on sprockets not visible behind the cam disk 71 mounted on the common sprocket axle 72. The piston of index solenoid 150 rests against successive cam disk notches or cams 73 advancing the conveyor chains 60 and 62 the distance between spaced positions or stations as cam disk 71 and the sprocket axle 72 are rotated by the successive strokes of the piston.

Figure 7:
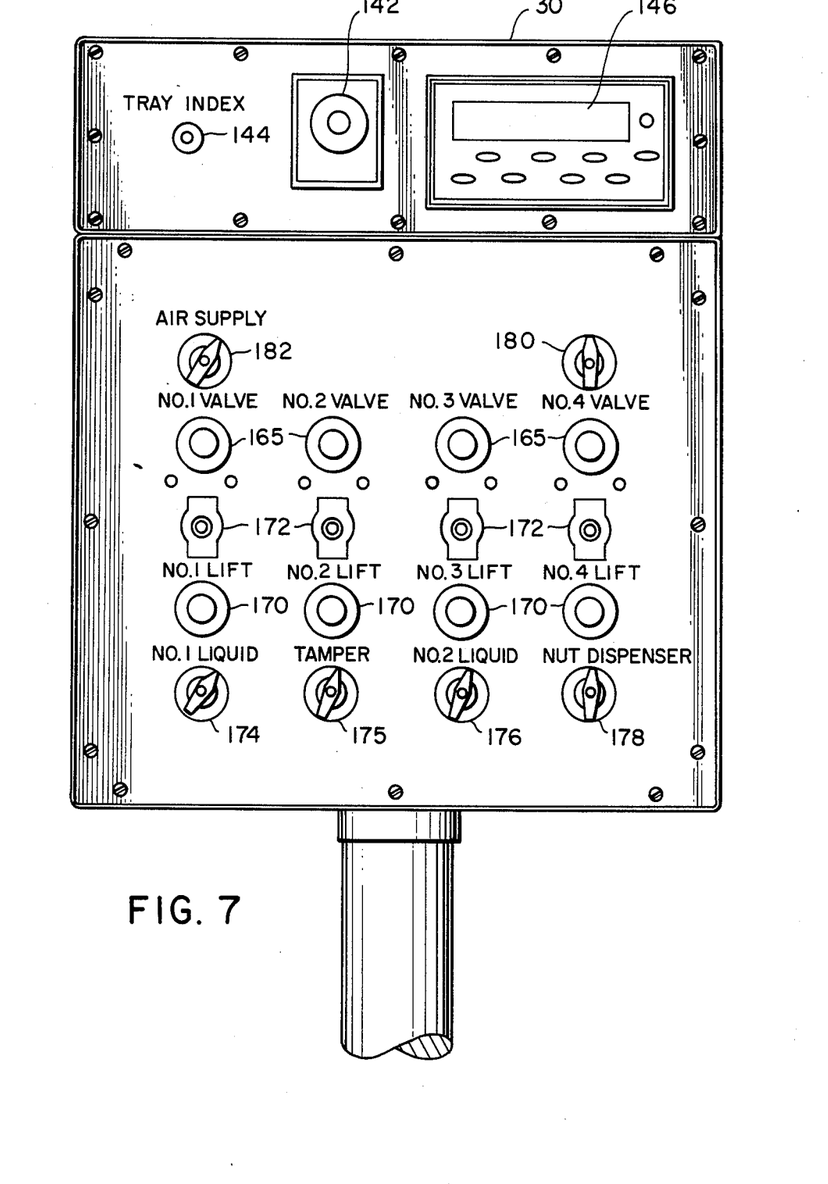
FIG. 7 is a diagrammatic plan view of the operator central ice cream command and control panel for the system apparatus or machine for manufacturing decorative ice cream cakes and pies.

Return switch or index microswitch 152 and the index timer or timer relay 140 in combination with the pilot solenoid 148 deliver the pneumatic signals on air lines (P) for operating the index solenoid 150. The index microswitch or return switch 152 actuates solenoid 150 for return of the piston at the end of each stroke. The index timer or timer relay 140 initiates the stroke at the end of each dwell period according to the frequency setting of the index timer 140 controlled by potentiometer 142 located on the control panel 30 as shown in FIG. 7.

Figure 3:
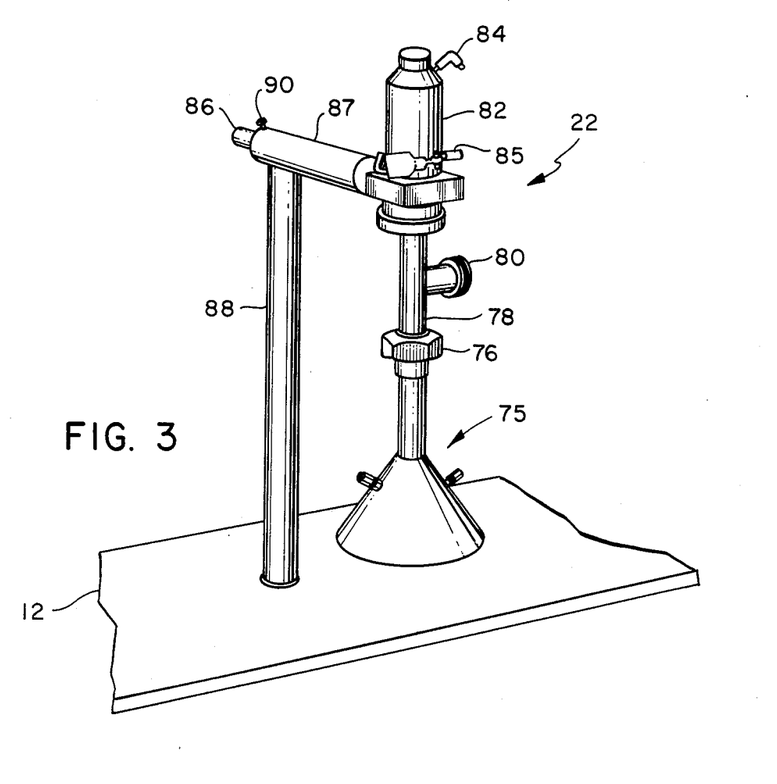
FIG. 3 is a detailed perspective view of an ice cream dispensing station and ice cream dispenser at one of the station locations along the frame and conveyor.

The ice cream dispenser 22 mounted at station 2 is shown in further detail in FIG. 3 and is the same as the ice cream dispensers 25 and 26 mounted at stations 5 and 6. The ice cream dispenser 22 is provided with an ice cream dispensing head 75 attached by coupling 76 to the ice cream inlet line 78. An ice cream pressure line not shown providing a continuous source of pressurized ice cream, for example at 40 psi, is connected at the ice cream inlet coupling 80.

The passage of ice cream under pressure through the ice cream inlet line 78 is controlled by the ice cream dispenser valve 82, a solenoid valve having a piston with a stroke of, for example, 3 to 4 inches (7.5 to 10 cm) that controls the opening through inlet coupling 80. Solenoid valve 82 is a three way pneumatical solenoid operated from air lines 84 and 85, and electrically doubly piloted by electrical signals as hereafter described.

The ice cream dispensing head 75, ice cream inlet line 78 and ice cream valve 82 are aligned along a vertical axis and mounted on a horizontal arm 86 in turn slightably mounted within sleeve 87 which is connected to the lift column 88. By means of the sliding translation of the arm 86 within sleeve 87 the relative extension position of the ice cream dispensing head or nozzle 75 over the conveyor 15 and ice cream cake or pie product 66 situated on the conveyor may be varied and set by the set screw 90.

The ice cream dispenser 22 and in particular the ice cream dispensing head or nozzle 75 is raised up and down in the vertical direction by the lift column 88 which slides through an opening in the upper surface of the frame 12 under control of a lift solenoid as hereafter described. The ice cream dispenser 22 and dispensing head or nozzle 75 is raised between an upper standby position and a lower ice cream dispensing position all as hereafter described. The relative height of the lower ice cream dispensing position may be adjusted by the hand crank 52 on the front of the frame 12 which operates the mechanism of FIGS. 5 and 5A as hereafter described.

Figure 4:
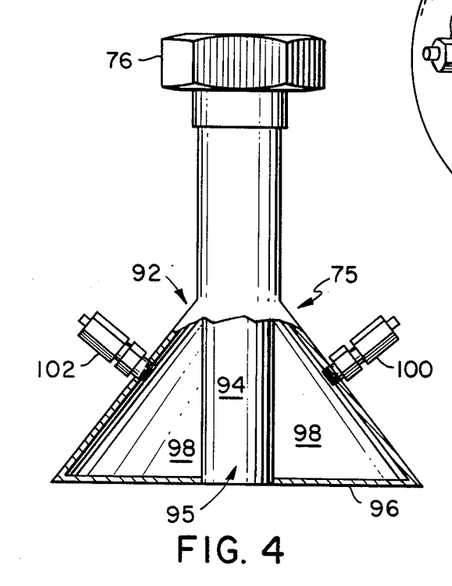
FIG. 4 is a detailed side view of the ice cream dispensing head or nozzle according to the invention coupled to the respective ice cream dispensers at the ice cream dispensing stations with a partial cutaway showing a side cross section of the ice cream spreading, shaping and forming area and adjacent water jacket.
Figure 4A:
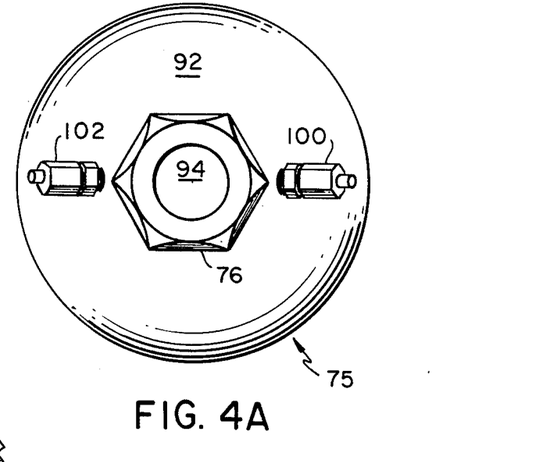
Figure 4B:
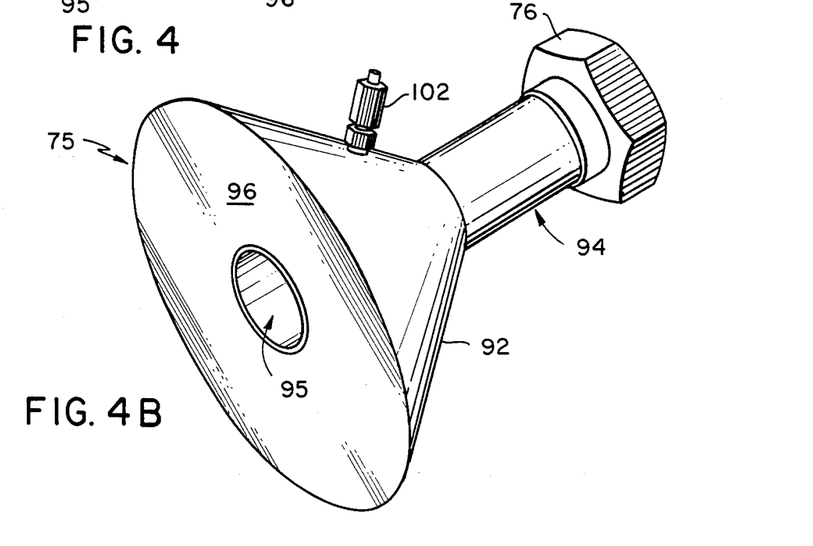
FIG. 4B is a perspective view from below of the ice cream dispensing head or nozzle showing the ice cream spreading, shaping, and forming surface area around the ice cream dispensing outlet of the dispensing head or nozzle.

The detailed structure of the novel ice cream dispensing head or nozzle 75 is illustrated in FIGS. 4, 4A and 4B. The ice cream dispensing head or nozzle housing 92 is formed with the coupling 76 for coupling to the ice cream inlet line 78 and a continuous source of pressurized ice cream. The nozzle housing 92 also includes a central ice cream dispensing channel 94 formed through the elongate direction of the housing 92 for delivering ice cream from the inlet end or coupling 76 to a nozzle dispensing outlet 95 for dispensing a flow of ice cream under pressure from the lower end of the housing 92. The nozzle housing 92 is flaired outward in the direction of the nozzle dispensing outlet 95, in this example in the configuration of a cone, to provide greater width at the nozzle outlet end 95.

The ice cream dispensing head or nozzle 75 is therefore formed with an ice cream spreading, shaping and forming surface area 96 around the nozzle outlet 95 substantially in a plane perpendicular to the ice cream dispensing flow direction. A feature and advantage of this construction arrangement is that ice cream dispensed under pressure from the nozzle outlet end 95 is constrained between the ice cream spreading shaping and forming surface area 96 and the preceding top layer of the ice cream cake or pie product to form a further shaped layer of ice cream of desired thickness.

In order to prevent ice cream dispensed from the nozzle outlet 95 from sticking to the shaping and forming surface area 96, the nozzle housing 92 is formed with a hollow portion or water jacket 98 around the nozzle dispensing outlet 95 and adjacent to the extended ice cream shaping and forming surface area 96. The water jacket 98 has a volume capacity of, for example, 1 pint (0.5 liter). Inlet and outlet couplings 100 and 102 are formed in the nozzle housing 92 for circulation of heating liquid such as water through the hollow portion or water jacket 98 over lines 103 and 104. A feature and advantage of this arrangement is that a temperature can be maintained over the extended ice cream shaping and forming surface area 96 to prevent ice cream from the formed layer from sticking to the surface area 96.

A variety of other dispensing head or nozzle configurations are contemplated by the invention providing extended ice cream shaping and forming surface areas around the nozzle outlet for spreading, shaping and forming ice cream layers in different desired configurations. In the preferred example of FIGS. 4, 4A and 4B a flat extended ice cream shaping and forming surface area 96 is provided generally perpendicular to the direction of dispensing ice cream flow. The extended surface area 96 may however be formed in other configurations to achieve desired ice cream layer shapes or configurations. In either event the extended surface area is accommodated by the flaring or increasing diameter of the dispensing head or nozzle housing 92 or by providing an ice cream dispensing head or nozzle with wider dimensions throughout sufficient to accommodate the desired diameter or width of the extended ice cream shaping and forming surface area 96. For example the ice cream dispensing head or nozzle may be of cylindrical, cubical or rectangular tetrahedral configuration. Furthermore the tapered ice cream dispensing head or nozzle of conical configuration in FIGS. 4, 4A and 4B may be for example of pyramid shape or other tapered geometrical configuration.

According to the invention the central ice cream dispensing channel 94 is of novel diameter for example 1¼ inches (8.5 cm) in diameter for effectively bulk dispensing of ice cream in comparison to the conventional small diameter tube filler nozzles 27a such as appear on the ice cream dispenser 27 of station 7. According to the present invention the novel diameter central ice cream dispensing channel 94 of the ice cream dispensing heads 75 on the ice cream dispensers 22, 25 and 26 of stations 2, 5, and 6 permits dispensing solid and chunky ingredients injected in and mixed in the ice cream including, for example nuts, cherries, and condiments such as fudge worl pieces, bonbons, etc. The conventional tube filler type ice cream nozzles 27a cannot be used with these solid injected items without clogging, etc. According to the present invention, the smaller tube filling nozzles 27a for example as shown at station 7 of FIG. 1 are used for decorating the top of the cake with ice cream rosettes.

Figure 5:
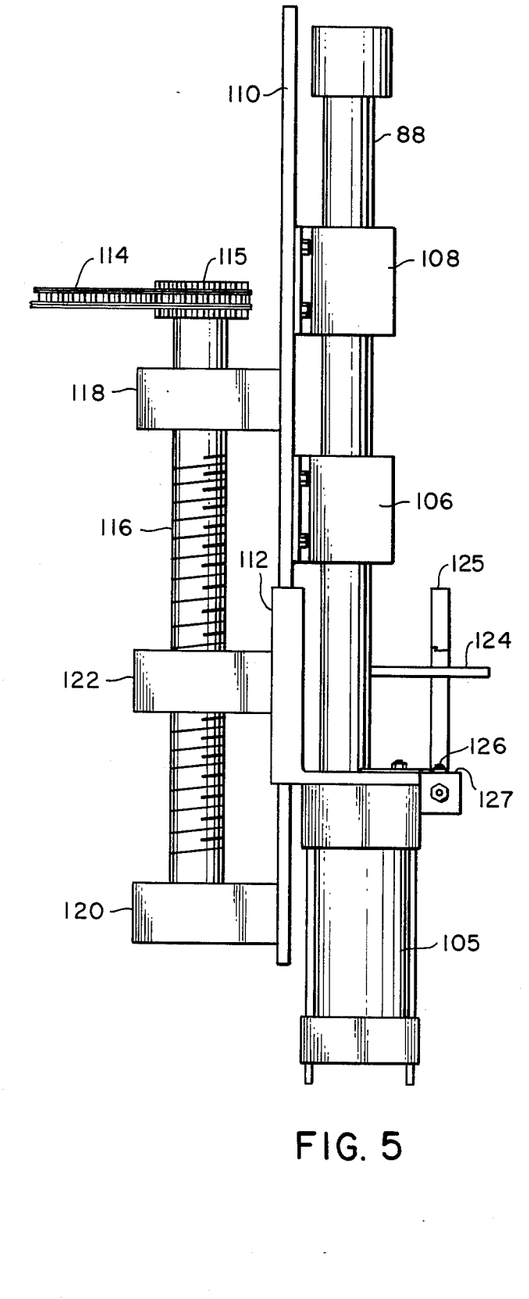
Figure 5A:
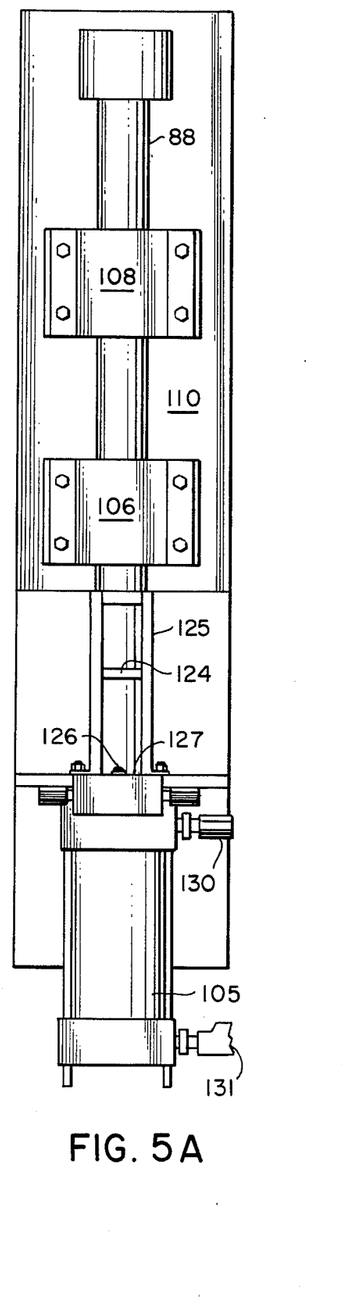
FIG. 5A is a front view of the lift.

The lift mechanism for a particular ice cream dispenser for example for raising and lowering ice cream dispenser 22 on the lift column 88 is illustrated in FIGS. 5 and 5A. The lift movement is provided by the lift solenoid 105 having a solenoid piston coupled to the lift column 88 for raising and lowering the respective ice cream dispenser between the raised standby position and the lower ice cream dispensing position over a stroke of, for example 4 inches (10 cm). The lift column 88 is mounted for sliding motion in vertical translation within linear bearings 106 and 108. Linear bearings 106 and 108 are secured in stationary position on the frame bracket 110 secured to the main frame 10.

The lift solenoid 105 itself is mounted relative to the frame bracket 110 on a sliding sleeve bracket 112 for adjusting the relative height of the lower dispensing position of lift column 88 and therefore the attached ice cream dispenser 22. Adjustment of the position of lift solenoid 105 and therefore adjustment of the lower ice cream dispensing position is accomplished by turning one of the hand cranks, e.g. hand crank 52 at the front of the machine frame 12 constructed and arranged for turning the chain drive 114 and drive gear 115. The drive gear 115 is mounted at the end of the threaded drive screw or bolt 116 secured to the frame bracket 110 by pillow blocks or pillow bearings 118 and 120. Sliding bracket or sleeve 112 which slides on the frame bracket 110 is coupled to the threaded drive screw or bolt 116 by the threaded nut or sleeve 122 which rides up and down the threaded drive screw or bolt 116 for adjusting the vertical position of lift solenoid 105 and therefore the relative height of the bottom or lower ice cream dispensing position for lift column 88 and ice cream dispenser 22.

A tongue or microswitch depressing extension 124 is fixed to the lift column 88 within guides 125 secured to shelf 127 of lift solenoid sleeve 112 so that when the piston of lift solenoid 105 is retracted to the lower position the tongue 124 actuates the lift microswitch 126 on shelf 127 which in turn initiates the valve open interval signals as hereafter described. The valve open interval signals actuate the ice cream dispenser valves for dispensing ice cream after the ice cream dispenser and dispensing head or nozzle are in the lower ice cream dispensing position.

The lift solenoid 105 is a three way pneumatical lift solenoid operated by air pressure over air lines 130 and 131. The lift solenoid 105 is electrically doubly piloted by electrical lift interval timing signals or position interval signals originating from an index microswitch as hereafter described. The index microswitch initiates the position interval timing signals to actuate solenoids 105 when the conveyor is indexed in position with products at the respective stations 1 through 9. The lift microswitches 126 in turn initiate or originate the valve interval timing signals controlling the opening and closing of the respective ice cream dispenser valves.

Figure 6:
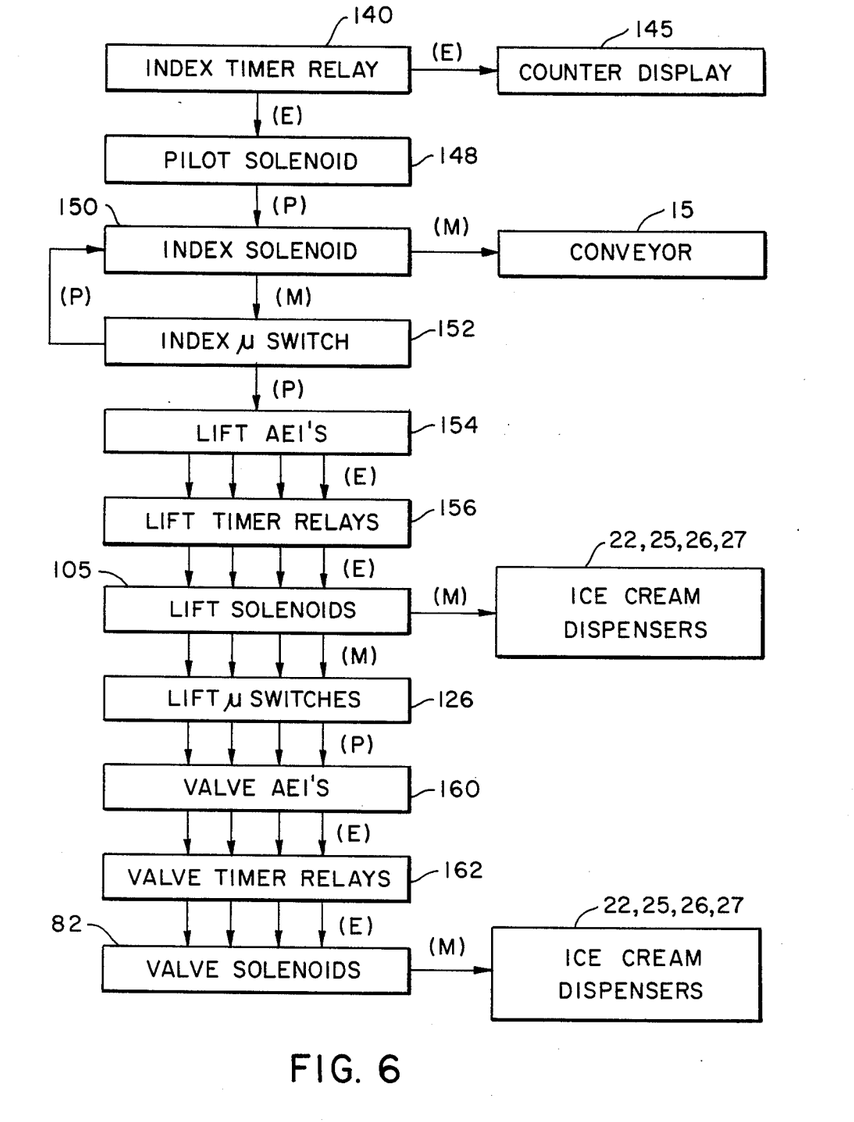
FIG. 6 is a schematic block diagram of the control system for the decorative ice cream cake and pie product manufacturing machine designating the electrical (E), pneumatic (P) and mechanical (M) couplings between the control elements.

A further description of the operational control elements of the ice cream cake and pie machine and manufacturing system is provided with reference to the block diagram of FIG. 6. The control system includes an index timer relay 140 which is a multi-range timer delivering electrical timing signals in the range of for example 10 to 24 electrical index signals per minute. The frequency of the index timer 140 is set by the index timer potentiometer 142 on the control panel or control head 30 mounted on the frame 12 as shown in FIG. 7. The index timer and system control is initially turned on at the on/off switch 144 of control panel 30. The selected index frequency or speed is monitored by counter timer 145 of FIG. 6 which provides a rate indicating display 146 on the control panel 30 of FIG. 7.

The frequency setting of the index timer relay 140 establishes the "dwell period", that is the time duration or period during which ice cream cake and pie products remain at the respective station. A longer dwell period or dwell time is required for more complex cake products while a shorter dwell period is manageable for simpler pie products. The dwell period at the respective stations is always longer than either the ice,cream dispensing position intervals or the valve open intervals hereafter described.

For production of decorative speciality ice cream cakes and pies the index speed or rate at which products are moved between the ingredient dispensing stations or other ingredient processing stations is typically in the range of 10 to 24 indexes or moves per minute. For the more complex ice cream cakes such as the Deering Ice Cream Corp. Black Forest (Trademark) ice cream cakes, a slower rate of movement and indexing between positions is required for example in the range of 10 to 14 indexing timer signals and indexing positions per minute. For the simpler ice cream pies such as for example the Deering Ice Cream Corp. Mint Chip Pie faster indexing timing signals with faster indexing between positions for example in the range of 20 to 22 index signals and index positions per minute is acceptable.

The electrical index timing signals (E) generated by the multi-range index timer 140 actuate an electrically piloted three way pilot solenoid 148 which is provided with a spring return. The pilot solenoid 148 generates, controls or releases pneumatic air pilot index signal pulses (P) for actuating the pneumatically doubly piloted three way index solenoid 150. The index solenoid piston with a stroke of for example 12 to 14 inches (30.5 to 35.5 cm) mechanically (M) drives the conveyor 15 by engaging a cam or dog on the conveyor chain 60, 62. At the end of the travel or stroke of the piston of index solenoid 150, a pneumatic index microswitch 152 is mechanically (M) actuated generating a pneumatic pilot signal (P) returning the three way index solenoid to its starting position before the dwell period elapses in preparation for the next index signal. The pneumatic index microswitch 152 also generates a second pneumatic signal (P) for initiating and originating the lift interval or position interval timing signals as hereafter described.

The pneumatic signals from index microswitch 152 initiate the lift interval or dispensing position interval timing signals according to the continuing sequence shown in FIG. 6. That is, the pneumatic signals (P) from index microswitch 152 are coupled to a first set of air to electric interfaces (AEI's) or lift AEI's 154, one interface for each lift solenoid corresponding to each ice cream dispensing station 22, 25, 26, and 27. In the example of FIG. 1 four lift solenoids or lift positioning devices 105 are provided corresponding to the four ice cream dispensers 22, 25, 26 and 27 at stations 2, 5, 6, and 7. The first set of air to electric interfaces or lift AEI's 154 therefore generate four respective corresponding electrical signals (E) actuating respectively four lift timer relays 156, one coupled to each of the four lift solenoids exemplified by lift solenoid 105 of FIGS. 5 and 5A.

Each of the lift timer relays 156 is an interval timer that generates an electrical run signal over an adjustable interval according to the selected dispensing position interval for the ice cream dispensing station. The lift solenoids 105 are electrically piloted three way pneumatic solenoid valves. The piston of lift solenoid 105 retracts at the initiation of the position interval timing signal from one of the lift timer relays 156 lowering the lift column 88 and ice cream dispenser 22, 25, 26, 27 to the lower ice cream dispensing position where the ice cream dispenser and dispensing head or nozzle remains during the dispensing position interval. At the end of the dispensing position interval signal the air returns to the other side of the piston of lift solenoid 105 lifting the column 88 and ice cream dispenser to the standby position.

In response to the lift interval or ice cream dispensing position interval timing signals originated by the index microswitch 152 all of the ice cream dispensers, 22, 25, 26 and 27 begin the descent from standby position to a lower ice cream dispensing position by the mechanical (M) motion of lift column 88. Because the height of the dispensing position is adjustable, the ice cream dispensers 22, 25, 26, 27 may reach the dispensing positions at different times. Upon retraction of the pistons of the lift solenoids 105 and descent of the lift columns 88 the full travel or stroke, the lift microswitches 126 on shelves 127 are mechanically (M) actuated by the respective tongues 124 generating pneumatic pulses or signals (P) for initiating or originating the valve open interval timing signals.

The sequence by which the pneumatic pulses or signals (P) from the lift microswitches 126 initiate or originate the dispensing position interval timing signals is further described with reference to FIG. 6. The pneumatic pulses from the pneumatic lift microswitches 126 are converted to electrical signals by the second set of air to electric interfaces (AEI's) or valve AEI's 160 providing electrical pulse signals (E) for each of the ice cream dispensing stations. The second set of air to electric interfaces or valve AEI's 160 are therefore also four in number according to the example of FIG. 1. The electrical signals (E) from the valve AEI's 160 actuate valve timer relays 162 in number equal to the respective ice cream dispensing stations for generating the respective valve open interval signals, also electrical signals (E).

The valve timer relays 162 are interval timers generating run signals or adjustable valve open interval signal having an adjustable duration equal to the desired valve open interval. In response to the valve open interval signals, the valve solenoids 82 of the respective ice cream dispensers 22, 25, 26, 27 retract the valve solenoid pistons mechanically (M) opening the pressurized ice cream inlet line 78 for dispensing ice cream through the ice cream dispensing heads or nozzles 75. Upon termination of the valve open interval signal and completion of the valve open interval the air is directed to the other side of the pistons of the three way pneumatic valve solenoids 82 closing the ice cream inlet lines 78 of the ice cream dispensing heads 75 of the ice cream dispensers 22, 25, 26 and 27. The ice cream dispenser valves are therefore mechanically (M) closed by the valve solenoids.

Figure 6A:
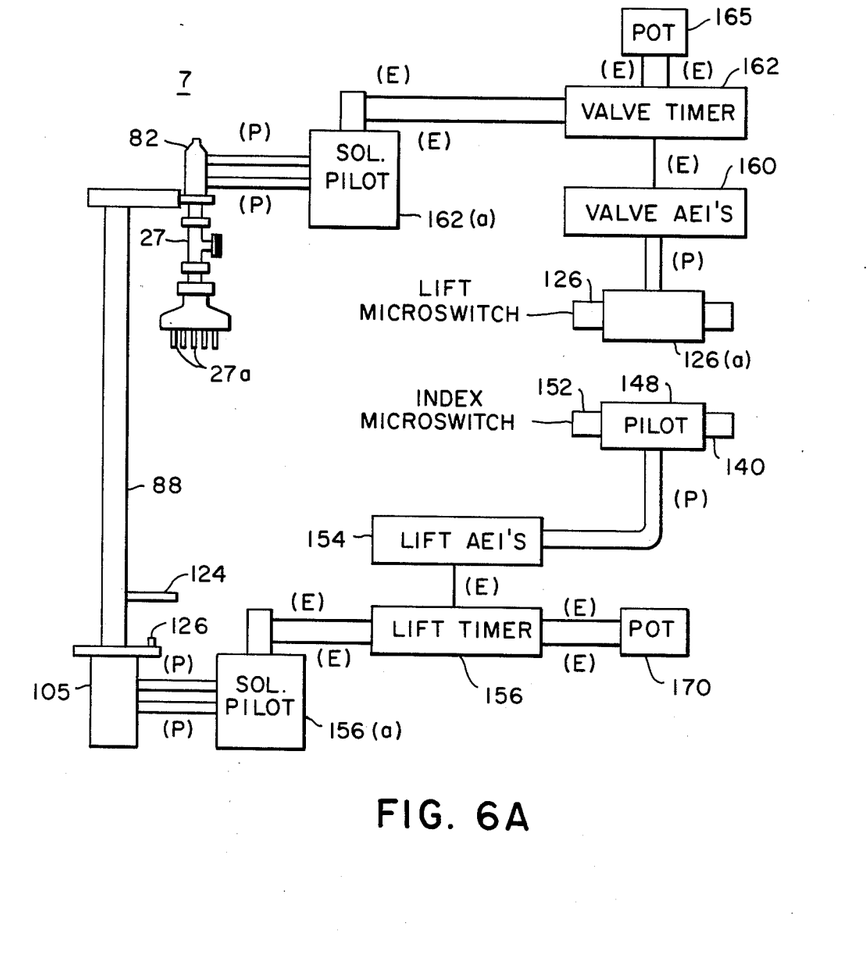
FIG. 6A is a schematic diagram of the electrical and pneumatic control circuits and lines for each ice cream dispensing station.

In accordance with FIGS. 6 and 7 and the detailed description of the specification in the preceding portions of the specification, the electrical and pneumatic control circuitry and coupling for one of the ice cream dispensing stations 7 is illustrated in FIG. 6A. Each of the ice cream dispensing stations follows the same arrangement. Referring at the same time to FIGS. 6 and 7, as shown in FIG. 6A, the index microswitch (index μ switch) or return switch 152 and switch solenoid or pilot solenoid 148 also deliver a pneumatic signal on air line (P) for actuating the lift solenoid 105. This is achieved by converting the pneumatic signal to an electric signal through the lift "air to electric interface" or AEI 154. The electric signal on electric line (E) actuates the lift timer relay or interval timer 156 which in turn electrically actuates the lift solenoid pilot 156a. Pneumatic signals on air lines (P) from lift solenoid pilot 156a control the lift solenoid 105 to raise and lower the ice cream rosette dispenser 27 at the beginning and end of the lift timer interval. The lift timer interval is set by the respective potentiometer 170 on the control panel 30.

In the lower position the lift microswitch (lift μ switch) 126 is actuated by tongue 124 to initiate the valve open interval. A pneumatic signal on air line (P) from lift microswitch 126 and associated switch solenoid 126a is converted to an electrical signal on electrical line (E) by the valve "air to electrical interface" of valve AEI 160 for actuating the valve interval time 162. Valve timer 162 delivers valve open interval signals over electrical lines (E) to the valve solenoid pilot 162a which in turn controls the valve solenoid and valve 82 by pneumatic signals on air lines (P). The valve solenoid and valve 82 is opened and closed at the beginning and end of the valve open interval for dispensing ice cream from the rosette ice cream dispenser 27. The duration of the valve open interval is set by the respective potentiometer 165 on the control panel 30.

Referring again to the control panel of FIG. 7, the duration of the valve open interval signals of the valve timer relays 162 may be adjusted by the valve timer potentiometers 165. Similarly, the lift interval or ice cream dispensing position interval timing signals from the lift timer relays 156 may be adjusted by the lift timer potentiometers 170. Three way on-off-on manual override switches 172 are also provided for control of the lift solenoids 105 and valve solenoid 82 for the respective ice cream dispensers 22, 25, 26 and 27.

Additional on/off pneumatic control switches are also included on control panel 30. The on/off pneumatic control switch 174 controls the liquid dispenser 21 at station 1, the on/off switch 175 controls the tamper 23 at station 3, the on/off switch 176 controls the second liquid dispenser 24 at station 4, the on/off switch 178 controls the nut dispenser 32 at station 9, and the on/off switch 180 controls the sauce dispenser or sprayer 28 at station 8. Finally, the main air supply can be turned on and off by switch 182.

A feature and advantage of the control elements and control panel 30 of the present invention is that the operating parameters of the respective ice cream dispensers for example dispensers 22, 25, 26 and 27 at stations 2, 5, 6 and 7 may be separately controlled for achieving different ingredient dispensing effects according to the product run. Thus, the valve timer potentiometers may be separately adjusted to vary the valve open timer interval signals and therefore the quantity and configuration of ice cream being dispensed at each particular station. Similarly, the lift timer potentiometers may be separately adjusted for varying the dispensing position interval. According to one application, the valve open interval signal extends beyond the duration of the lift position or ice cream dispensing position interval signal so that ice cream is dispensed as the ice cream dispensing head or nozzle is raised from the ice cream cake or pie product to achieve a desired effect. Both the dispensing position interval and the valve open interval are less than the dwell period. In addition to the rapid changeover permitted by the control elements and control panel of the present invention for different product runs, the present invention facilitates product design and development.

While the invention has been described with reference to particular example embodiments, it is intended to cover all modifications and equivalents within the scope of the following claims.

I claim:

1. A system for manufacturing decorative ice cream cake and pie products comprising:
    a plurality of ingredient dispensing stations including a plurality of ice cream dispensing stations, each ice cream dispensing station comprising an ice cream dispenser including an ice cream dispensing head constructed and arranged for dispensing ice cream on a product indexed or positioned at the station;
    conveyor means for simultaneously conveying a plurality of products between the respective stations and for indexing or positioning the products at the respective stations;
    a plurality of lift positioning means each operatively coupled to a respective ice cream dispenser and constructed and arranged for lowering and raising the ice cream dispenser at the respective station between a raised standby position and a lowered dispensing position;
    a plurality of valve means each operatively coupled to a respective ice cream dispenser and constructed and arranged for opening and closing between a valve open position for flow of ice cream through the ice cream dispensing head from a continuous pressurized source of ice cream coupled to the ice cream dispensing head and a valve closed position for blocking the dispensing head flow of ice cream;
    index timer means for generating timed index pilot signals for actuating the conveyor means, said index timer means being operatively coupled to the conveyor means for actuating the conveyor means to convey products between stations and maintain the products at each station for a selected dwell period, said index timer means being adjustable for varying the frequency of the index pilot signals and the dwell period at the stations according to the products on the conveyor means indexed or positioned at the respective ingredient dispensing stations;
    a plurality of position timer means for generating dispensing position interval signals and actuating the lift positioning means, each position timer means being operatively coupled to a respective lift positioning means for actuating the lift positioning means to lower the ice cream dispenser to the dispensing position and maintain the ice cream dispenser in the lowered dispensing position during a selected dispensing position interval less than the dwell period, said position timer means and dispensing position interval signals being adjustable to vary the dispensing position interval for achieving different ice cream configurations according to the products on the conveyor means indexed or positioned at the ice cream dispensing stations;
    said conveyor means being operatively arranged and coupled for actuating the position timer means when products are indexed or positioned at the respective stations to initiate the dispensing position interval signals;
    and a plurality of valve timer means for generating valve open interval signals and actuating the respective valve means, each valve timer means being operatively coupled to a respective valve means for actuating and opening the respective valve means of the ice cream dispenser and for maintaining the valve means in open position for dispensing ice cream during a selected valve open interval less than the dwell period, said valve timer means and valve open interval signals being adjustable to vary the valve open interval for dispensing different quantities of ice cream and for achieving different ice cream configurations according to the products on the conveyor means indexed or positioned at the ice cream dispensing stations;
    said lift positioning means being operatively arranged and coupled for actuating the valve timer means to initiate the valve open interval signals when the ice cream dispenser is in the lowered dispensing position.

2. The system of claim 1 wherein the ice cream dispensing head comprises an elongate housing formed with an ice cream dispensing channel through the elongate direction of the housing and a dispensing outlet at the end of the housing, said housing being formed with an extended ice cream shaping and forming surface area around the dispensing outlet for contact shaping and forming ice cream flowing through the dispensing channel and outlet, said housing being formed with at least a hollow portion at the dispensing outlet end of the housing adjacent to the extended ice cream shaping and forming surface area, and inlet and outlet couplings formed in the housing for circulation of heating liquid through the hollow portion to prevent sticking of ice cream on the extended ice cream shaping and forming surface area.

3. The system of claim 1 wherein each valve means comprises a three-way electrically piloted pneumatic solenoid, wherein said valve timer means comprises an interval valve timer relay generating electrical valve open interval signals for electrically piloting the valve solenoid to open said valve solenoid at the beginning of the valve open interval and close said valve solenoid at the end of the valve open interval;

and wherein each lift positioning means comprises a three-way electrically piloted pneumatic lift solenoid and wherein each position timer means comprises an interval position timer relay for generating electrical dispensing position interval signals for electrically piloting the lift solenoid and lowering the respective ice cream dispenser to the dispensing position at the beginning of the dispensing position interval and raising the ice cream dispenser to the standby position at the end of the dispensing position interval.

4. The system of claim 3 further comprising a plurality of pneumatic dispensing position microswitches each operatively positioned at a dispensing station for actuation when the respective ice cream dispenser reaches the dispensing position, said pneumatic dispensing position microswitches thereby generating valve actuating air signals, and a plurality of first air to electric interface means operatively coupled between the pneumatic dispensing position microswitches and respective valve timer means for converting the air signals to electrical signals to initiate valve open interval signals.

5. The system of claim 4 wherein the conveyor means further comprises:
a pneumatic index solenoid for driving the conveyor means between stations, said index solenoid being operatively arranged and coupled for actuation at each index pilot signal of the index timer means to drive the conveyor between stations and index or position products at the respective stations;
and index microswitch means operatively positioned for actuation at the completion of the stroke of said solenoid when products are indexed or positioned at the respective dispensing stations, said index microswitch means being operatively coupled to the plurality of position timer means for initiating position interval signals.

6. The system of claim 1 wherein the ice cream dispensing head comprises a nozzle housing formed with an ice cream flow inlet coupling for coupling to a continuous pressurized source of ice cream, a nozzle dispensing channel and a nozzle dispensing outlet for dispensing a flow of ice cream under pressure, said nozzle housing being flared outward in the direction of the nozzle dispensing outlet to provide greater width at the nozzle outlet end, said ice cream dispensing head being formed with an ice cream shaping and forming surface area around the nozzle outlet substantially in a plane generally perpendicular to the ice cream dispensing flow direction for contact shaping and forming ice cream dispensed from the nozzle outlet, said nozzle housing being hollow at the nozzle outlet end where it is flared to greater width, said nozzle housing being formed with an inlet coupling and an outlet coupling for circulation of heating liquid through the hollow portion of the nozzle housing to prevent sticking of ice cream dispensed from the nozzle outlet on the shaping and forming surface area.

7. The system of claim 6 wherein the ice cream dispensing head comprises a nozzle dispensing channel through the nozzle housing of sufficient diameter for dispensing solid ingredients mixed with the ice cream selected from the group consisting of nuts, fruits, and condiments, without blocking or clogging the nozzle.

8. The system of claim 1 further comprising control panel means having control elements operatively coupled to the index timer means, position timer means, and valve timer means for operator interaction and control of the respective index pilot signals, dispensing position interval signals, and valve open interval signals for controlling the quantity and configuration of ice cream dispensed at the respective ice cream dispensing stations.

9. The system of claim 8 further comprising a plurality of height adjustment means operatively coupled to the respective lift positioning means for adjusting the height of the lowered dispensing position relative to products on the conveyor means indexed or positioned at the respective ice cream dispensing stations.

10. A system for manufacturing decorative ice cream cake and pie products comprising:
a plurality of ingredient dispensing stations including a plurality of ice cream dispensing stations, each ice cream dispensing station comprising an ice cream dispenser including an ice cream dispensing head constructed and arranged for dispensing ice cream on a product indexed or positioned at the station;
conveyor means for simultaneously conveying a plurality of products between the respective stations and for indexing or positioning the products at the respective stations;
a plurality of valve means each operatively coupled to a respective ice cream dispenser and constructed and arranged for opening and closing between a valve open position for flow of ice cream through the ice cream dispensing head from a continuous pressurized source of ice cream coupled to the ice cream dispensing head and a valve closed position for blocking the dispensing flow of ice cream;
index timer means for generating timed index pilot signals for actuating the conveyor means, said index timer means being operatively coupled to the conveyor means for actuating the conveyor means to convey products between stations and maintain the products at each station for a selected dwell period, said index timer means being adjustable for varying the frequency of the index pilot signals and the dwell period at the stations according to the products on the conveyor means indexed or positioned at the respective ingredient dispensing stations;
and a plurality of valve timer means for generating valve open interval signals for actuating the respective valve means, said valve timer means being operatively coupled to the respective valve means for actuating and opening the respective valve means of the ice cream dispenser and for maintaining the valve means in open position for dispensing ice cream during selected valve open intervals, said valve timer means being adjustable to vary the valve open interval for dispensing different quantities of ice cream and for achieving different ice cream configurations according to the products on the conveyor means indexed or positioned at the ice cream dispensing stations, said valve open interval being less than said dwell period.

11. The system of claim 10 wherein the ice cream dispensing head comprises an elongate housing formed with an ice cream dispensing channel through the elongate direction of the housing and a dispensing outlet at the end of the housing, said housing being formed with an extended ice cream shaping and forming surface area around the dispensing outlet for contact shaping and forming ice cream flowing through the dispensing channel and outlet, said housing being formed with at least a hollow portion at the dispensing outlet end of the housing adjacent to the extended ice cream shaping and forming surface area, and inlet and outlet couplings formed in the housing for circulation of heating liquid through the hollow portion to prevent sticking of ice cream on the extended ice cream shaping and forming surface area.

12. A new ice cream dispenser comprising:
an ice cream dispensing head formed with a dispensing channel and outlet for dispensing a continuous flow of ice cream, and an ice cream inlet coupling for coupling a continuous pressurized source of ice cream to the ice cream dispensing head;
positioning means constructed and arranged for lowering and raising the ice cream dispensing head between a raised standby position and a lowered dispensing position;
valve means operatively coupled to the ice cream dispensing head and constructed and arranged for opening and closing between a valve open position for flow of ice cream through the dispensing channel and outlet from a continuous pressurized source of ice cream coupled to the ice cream inlet coupling of the dispensing head, and a valve closed position blocking the flow of ice cream through the dispensing channel and outlet of the ice cream dispensing head;
position timer means operatively coupled to the positioning means for actuating the positioning means and maintaining the ice cream dispensing head in the lower dispensing position for a selected dispensing position interval, said position timer means being adjustable for varying the dispensing position interval;
valve timer means operatively coupled to the valve means for actuating the valve means and maintaining the valve means in the valve open position for dispensing a flow of ice cream during a valve open interval, said valve timer means being adjustable for varying the valve open interval.

13. The ice cream dispenser of claim 12 wherein the ice cream dispensing head comprises an elongate dispensing head formed with a dispensing channel through the elongate direction of the dispensing head and a dispensing outlet at one end of the head, said ice cream dispensing head being formed with an extended ice cream shaping and forming surface area around the dispensing outlet in a plane substantially perpendicular to the flow of ice cream through the dispensing channel and outlet for contact shaping and forming ice cream dispensed from the dispensing outlet, said dispensing head being formed with at least a hollow portion at the dispensing outlet end adjacent to the ice cream shaping and forming surface area, said dispensing head being formed with inlet and outlet couplings for circulating heating liquid through the hollow portion of the dispensing head to prevent sticking of ice cream on the ice cream shaping and forming surface area at the dispensing outlet end.

14. The ice cream dispenser of claim 13 wherein the dispensing channel through the ice cream dispensing head is of sufficient diameter for dispensing solid ingredients mixed with the ice cream selected from the group consisting of nuts, fruits, and condiments, without blocking or clogging the dispensing channel through the dispensing head.

15. The ice cream dispenser of claim 13 wherein the forming surface area around the dispensing outlet comprises a generally flat surface lying in the plane substantially perpendicular to the direction of flow of ice cream through the dispensing channel and outlet.

16. A new ice cream dispensing head comprising an elongate nozzle housing formed with an ice cream dispensing channel through the elongate direction of the housing with a dispensing outlet at one end of the housing, said nozzle housing being constructed and arranged with an extended ice cream shaping and forming surface area around the dispensing outlet for contact shaping and forming of ice cream after it is dispensed from the outlet, said ice cream shaping and forming surface area being oriented and arranged substantially in a plane perpendicular to the direction of flow of ice cream through the dispensing channel and outlet for surface contact of the ice cream shaping and forming surface area against ice cream after it is dispensed from the ice cream dispensing head for shaping and forming the ice cream, said nozzle housing being formed with at least a hollow portion at the dispensing outlet end, said hollow portion being adjacent to the ice cream shaping and forming surface area, said nozzle housing being formed with inlet and outlet couplings for circulating heating liquid through the hollow portion to prevent sticking of ice cream to the ice cream shaping and forming surface area after contact shaping of the dispensed ice cream.

17. The ice cream dispensing head of claim 16 wherein the ice cream dispensing channel through the elongate direction of the nozzle housing is formed with sufficient diameter for dispensing solid imgrdients mixed with the ice cream selected from the group consisting of nuts, fruits, and condiments, without blocking or clogging the nozzle.

18. A system for manufacturing decorative ice cream cake and pie products comprising:
a plurality of ingredient dispensing stations including a plurality of ice cream dispensing stations, each ice cream dispensing station comprising an ice cream dispenser including an ice cream dispensing head constructed and arranged for dispensing ice cream on a product indexed or positioned at the station;
conveyor means for simultaneously conveying a plurality of products between the respective stations and for indexing or positioning the products at the respective stations;

index timer means operatively coupled to the conveyor means for actuating the conveyor means and for maintaining the products at each station for a selected dwell period;

a plurality of valve means each operatively coupled to a respective ice cream dispenser and constructed and arranged for opening and closing between a valve open position for flow of ice cream through the ice cream dispensing head from a continuous pressurized source of ice cream coupled to the ice cream dispensing head and a valve closed position for blocking the dispensing flow of ice cream;

and a plurality of valve timer means for generating valve open interval signals for actuating the respective valve means, said valve timer means being operatively coupled to the respective valve means for actuating and opening the respective valve means of the ice cream dispenser and for maintaining the valve means in open position for dispensing ice cream during selected valve open intervals less than said dwell period, said valve timer means being adjustable to vary the valve open interval for dispensing different quantities of ice cream and for achieving different ice cream configurations according to the products on the conveyor means indexed or positioned at the ice cream dispensing stations.

19. The system of claim 18 wherein the ice cream dispensing head comprises an elongate housing formed with an ice cream dispensing channel through the elongate direction of the housing and a dispensing outlet at the end of the housing, said housing being formed with an extended ice cream shaping and forming surface area around the dispensing outlet for contact shaping and forming ice cream after it is dispensed through the dispensing channel and outlet by surface contact of the dispensed ice cream with the ice cream shaping and forming surface area, said housing being formed with at least a hollow portion at the dispensing outlet end of the housing adjacent to the extended ice cream shaping and forming surface area, and inlet and outlet couplings formed in the housing for circulation of heating liquid through the hollow portion to prevent sticking of ice cream on the extended ice cream shaping and forming surface area after contact shaping and forming of the dispensed ice cream.

20. A new ice cream dispenser comprising:

an ice cream dispensing head formed with a dispensing channel and outlet for dispensing a continuous flow of ice cream, and an ice cream inlet coupling for coupling a continuous pressurized source of ice cream to the ice cream dispensing head;

positioning means constructed and arranged for lowering and raising the ice cream dispensing head between a raised standby position and a lowered dispensing position;

valve means operatively coupled to the ice cream dispensing head and constructed and arranged for opening and closing between a valve open position for flow of ice cream through the dispensing channel and outlet from a continuous pressurized source of ice cream coupled to the ice cream inlet coupling of the dispensing head, and a valve closed position blocking the flow of ice cream through the dispensing channel and outlet of the ice cream dispensing head; and valve timer means operatively coupled to the valve means for actuating the valve means and maintaining the valve means in the valve open position for dispensing a flow of ice cream during a valve open interval, said valve timer means being adjustable for varying the valve open interval.

* * * * *